United States Patent Office 3,001,620
Patented Sept. 26, 1961

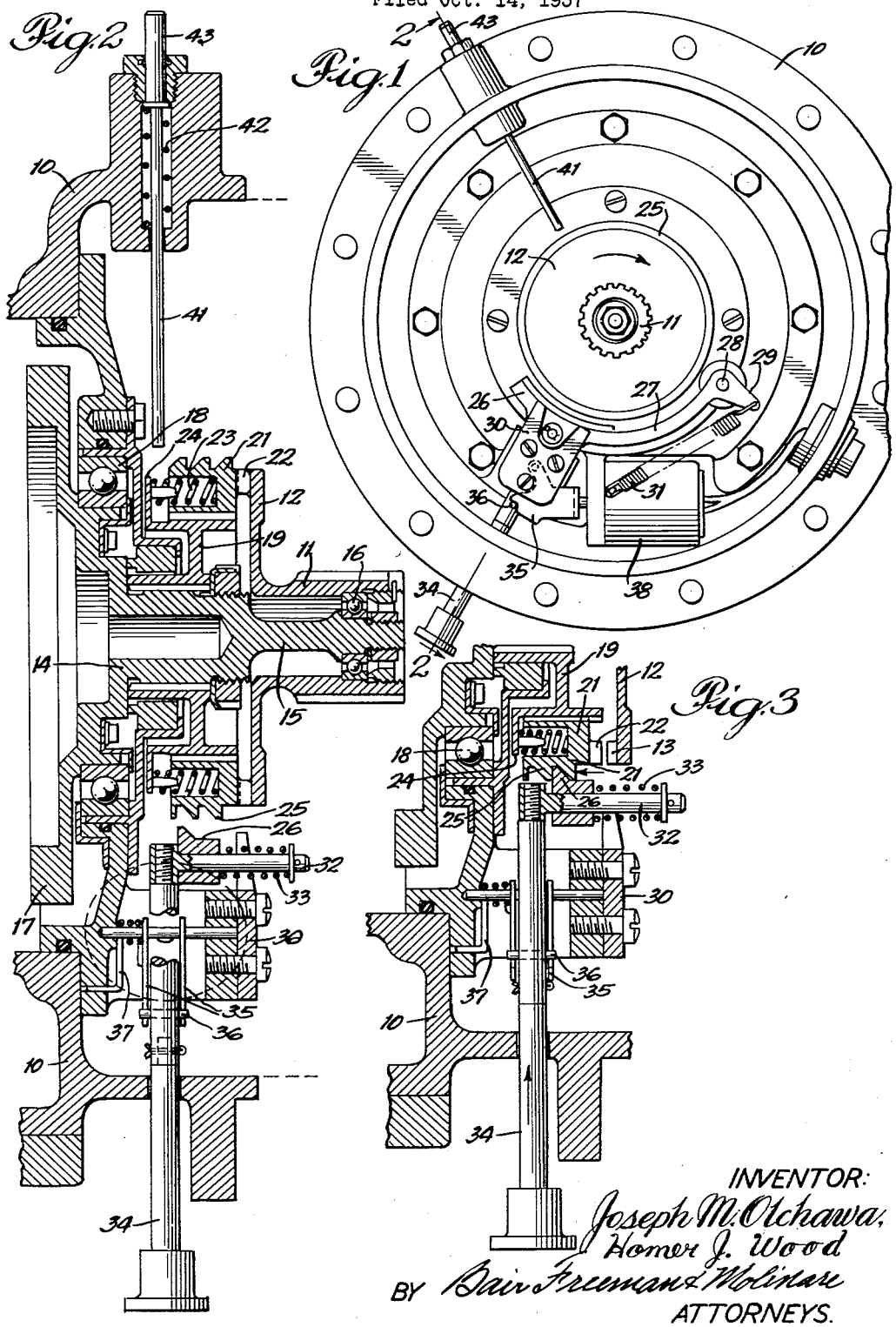

3,001,620
TORQUE DISCONNECT
Joseph M. Olchawa, Chicago, Ill., and Homer J. Wood, Sherman Oaks, Calif., assignors to Foote Bros. Gear & Machine Corp., Chicago, Ill., a corporation of Delaware
Filed Oct. 14, 1957, Ser. No. 689,863
3 Claims. (Cl. 192—24)

This invention relates to a torque disconnect and more particularly to a device for disconnecting a driven mechanism from a driving source while under load.

While the torque disconnect of the present invention is capable of a wide variety of uses, it finds particular application to the driving of a mechanism or accessory from a prime mover whose principal purpose is to drive some other device. For example, in aircraft it is common practice to drive various accessories, such as electric generators or alternator, hydraulic pumps, and the like, from the main engines which also drive the propellers. In the event an accessory is damaged or fails, it is frequently necessary to stop it in order to eliminate overheating and danger of fire. Heretofore, this has necessitated stopping the engine with the resultant loss of its entire flying power.

There are also applications in which it is not desirable to use conventional overload devices, such as shear pins. For example, in a mechanism, such as an electrical apparatus designed for temporary overload but incapable of accepting a sustained overload, a shear pin is not satisfactory. Neither can shear pins be used satisfactorily in mechanisms in which replacement of the shear pin is difficult such as by requiring disassembly of the apparatus.

It is therefore one of the objects of the present invention to provide a torque disconnect which normally transmits full torque with a minimum of friction loss and which can be disconnected to interrupt the torque completely with no drag.

Another object is to provide a torque disconnect in which torque is normally transmitted directly through a positive clutch, such as a tooth clutch, and the clutch can be disengaged rapidly to interrupt the torque.

According to a feature of the invention, one element of the clutch is shiftable axially through a screw thread to provide rapid and positive operation. The threaded clutch element may be engaged by a threaded segment when it is to be shifted with the segment normally held out of engagement therewith by a releasable latch. The segment may be moved away from the threaded clutch element to re-engage the latch by an operating handle easily accessible from the outside of the disconnect casing.

A further object is to provide a torque disconnect in which the position of the clutch elements can easily be detected from the outside of the disconnect casing.

According to a feature of the invention, a feeler rod is provided operable from the outside of the disconnect casing which misses the shiftable clutch element and is therefore freely movable when the clutch is engaged and which engages the clutch element to have its movement limited when the clutch is fully or partially disengaged.

The above and other objects and features of the invention will be more readily apparent from the following description when read in connection with the accompanying drawing, in which:

FIGURE 1 is an end elevation of a torque disconnect embodying the invention looking from the right in FIGURE 2;

FIGURE 2 is a section on the broken line 2—2 of FIGURE 1 showing the clutch engaged; and FIGURE 3 is a partial section similar to FIGURE 2 showing the clutch disengaged.

The disconnect of the present invention may be enclosed in any desired type of housing, as partially indicated at 10, which is preferably designed to cooperate with the housing parts of the mechanisms with which it is to be used. For example, the housing 10 may be constructed to fit on one side against the housing of a driving mechanism, such as an engine casing, and at its other side to fit against the housing of an accessory to be driven.

The disconnect itself comprises a driving member 11 which may be in the form of a tubular shaft externally splined to be engaged by the driving element of an engine, or the like, and which is provided with an outwardly extending flange 12 formed on one face with clutch teeth 13. A driven element 14 is coaxial with the driving shaft 10 and may have an extension 15 thereon carrying a bearing 16 on which the driving shaft is supported. The driven element 14 in the form shown has a flange 17 at one side to be connected to a driven mechanism, such as an alternator, and is rotatably supported on a bearing 18 in the housing. Intermediate its ends the driven element is splined and rigidly carries an annular ring 19 which is externally splined to receive a clutch ring 21 for axial shifting movement. The clutch ring 21 is provided at one end with clutch teeth 22 complementary to the clutch teeth 13 to engage therewith and is urged axially toward the flange 12 to engage the clutch by a series of compression springs 23. The springs 23 preferably fit into recesses in the clutch ring 21 and engage a flange 24 formed on the annular ring 19.

To effect disengagement of the clutch the external surface of the clutch ring 21 is formed with a spiral screw thread 25 which is preferably shaped as a buttress thread, as shown, with its square surface facing the flange 12. The thread 25 is adapted to be engaged by a thread on a segment 26 which is mounted for radial movement toward and away from the clutch ring 21. As best seen in FIGURE 2, the segment 26 is carried by an arm 27 pivoted in the housing on a pivot axis 28 for swinging toward and away from the clutch ring 21. The arm 27 is preferably provided with an angular projection 29 and a spring 31 is connected between the projection and a fixed point on the housing to urge the segment toward the clutch ring.

The segment, as shown, is supported for sliding movement on the pivot pin 28 and on a second pin 32 so that it can slide axially of the driving and driven members. Springs 33 on the pins urge the segment to the left, as shown, but may be compressed to permit the segment to move resiliently to the right during operation. Due to this mounting, the segment can shift axially in response to threading force exerted thereby on the clutch ring to absorb shock. Movement of the segment against the springs 33 is limited by a fork member 30 fixedly secured to the housing and spanning the rod 32. After a predetermined shifting movement of the segment, it will engage the fork member 30 so that further shifting movement thereof will be positively limited.

For controlling the segment the pin 32 is connected to a resetting rod 34 which projects radially outward through the housing and which is slidable radially. When the rod is pulled out to the position shown in FIGURES 1 and 2, it will move the segment away from the clutch ring 21 so that the clutch will be engaged by the springs 23 and will be held in engagement. To hold the rod and segment in this position, a latch is provided in the form of a pair of connected plates 35 spanning the rod 34, as shown in FIGURE 2, and having latch notches thereon engageable with a cross pin 36 carried by the rod 34. A spring 37 urges the latch plates toward the rod 34 to engage the latch.

To disengage the latch any suitable control means may be provided which will swing the latch plate 35 away from the rod to release the pin 36. As shown, the disconnect is adapted to be controlled remotely and for this purpose a solenoid 38 is mounted in the casing and is connected to the latch plate to swing it away from the rod. The solenoid may be controlled in any desired manner either manually or automatically to disconnect the torque when desired. In order to determine the position of the clutch accurately and without the necessity of opening the housing a feeler element is provided which can be operated from the outside of the housing. As shown, this mechanism is in the form of a feeler rod 41 slidable radially in the housing and normally urged outward by a spring 42. The feeler rod terminates in a button 43 projecting beyond the outside of the housing and which can easily be engaged by a user to press the rod radially inward. The rod 41 is so positioned, as shown in FIGURE 2, that when the clutch ring 21 is shifted fully to the right with the clutch in engagement, the end of the rod will miss the left end of the clutch ring so that the rod can be fully depressed freely. When the clutch ring 21 is shifted to the left even a relatively small amount, the end of the rod 41 will strike and inward movement will be limited indicating to the operator that the clutch is either fully or partially disengaged. In this way, the condition of the mechanism can be checked quickly and accurately without the necessity of opening the housing when the clutch is to be reset.

In use, assuming that the disconnect is utilized to drive an engine accessory and that the accessory fails or becomes in a dangerous condition for any reason, the disconnect may be operated to disconnect the accessory from the engine without interfering with the primary function of the engine. To accomplish this the solenoid 38 may be temporarily energized to release the latch 35 and allow the rod 34 and segment 26 to move radially inward. Upon inward movement of the segment 26 the threads thereon will mesh with the threads 25 on the clutch ring 21 and since the clutch ring 21 is turning it will tend to be shifted axially to the left to disengage the clutch teeth 13 and 22. Initially upon engagement of the segment with the threads 25, the segment will be shifted to the right against the springs 33 and this movement not only takes up the initial shock, but also insures that the threads on the segment will have time to move into full mesh with the threads 25 before a heavy load is placed thereon.

Movement of the threads on the segment into full mesh with the threads 25 on the clutch ring and maintenance of full meshing are also assisted by the mounting of the segment and the friction forces on the threads. As seen in FIGURE 1, the clutch ring 21 is turning clockwise and the segment 26 lies clockwise from the pivot 28. Therefore, friction forces on the segment 26 tending to turn it clockwise will react against the pivot 28 through tension in the lever 27 and will tend to pull the segment toward the ring 21. This not only assists in effecting full initial engagement of the threads but tends to hold them in engagement during shifting of the clutch ring 21.

As soon as the segment engages the fork 30, its axial shifting will be limited and further turning of the clutch ring 21 will cause it to be shifted positively and rapidly to the left to disengage the clutch teeth. It will be noted that two or three revolutions at the most are required to effect complete disengagement of the clutch so that a very short time interval is involved. Furthermore, even though the clutch ring 21 and its connected parts will come to rest as soon as the clutch teeth are disengaged, there will be enough intertia on these parts to turn the clutch ring slightly beyond the full disengaging position to leave the clearance between the tips of the clutch teeth 13 and 22 so that there will be no residual drag.

When the clutch is to be re-engaged, the handle 34 may be pulled outward to move the segment 26 away from the clutch ring 21 and to re-engage the latch. At this time, the feeler finger 41 may be depressed to determine quickly and accurately whether or not the clutch is in full engagement so that it is ready for reuse.

While one embodiment of the invention has been shown and described herein, it will be understood that it is illustrative only and not to be taken as a definition of the scope of the invention, reference being had for this purpose to the appended claims.

What is claimed is:

1. A torque disconnect comprising coaxial driving and driven members, cooperating clutch members drivably connected to the driving and driven members respectively, means mounting one of the clutch members for axial movement into and out of driving engagement with the other clutch member, said one of the clutch members having a spiral thread on its outer surface, a threaded segment movable radially into and out of meshing engagement wtih the spiral thread, means mounting the segment for limited movement axially of the spiral thread, a spring urging the segment axially in one direction resiliently to absorb the initial shock when the segment engages the thread, a spring urging the segment radially inward toward the spiral thread, a latch to hold the segment out of engagement with the thread, means to release the latch, and a resetting device connected to the segment to move it out and to re-engage the latch.

2. A torque disconnect comprising coaxial driving and driven members, a ring slidably splined on the driven member for axial movement thereon, cooperating clutch elements on the ring and the driving member to engage when the ring is moved axially toward the driving member and to disengage when the ring is moved away from the driving member, a spring urging the ring toward the driving member, the ring having an external helical thread thereon, a threaded segment movable radially into and out of mesh with said thread, a lever on which the segment is carried pivoted on an axis anterior to the segment relative to the direction of rotation of the driving and driven members whereby friction forces on the segment urge it toward the ring, means mounting the segment and lever for limited movement axially of the helical thread, spring means urging the segment and lever axially in one direction to resist the shock resiliently when the segment engages the thread, a latch to hold the segment radially away from the ring, and means to control the latch.

3. A torque disconnect comprising coaxial driving and driven members, cooperating clutch members drivably connected to the driving and driven members respectively, means mounting one of the clutch members for axial movement into and out of driving engagement with the other clutch member, said one of the clutch members having peripheral cam surfaces thereon, a follower member movable radially into and out of engagement with the cam surface, means mounting the follower member for limited movement axially of the clutch members, a spring urging the follower member axially in one direction resiliently to absorb the initial shock when the follower member engages the cam surface, and means controlling radial movement of the follower member.

References Cited in the file of this patent
UNITED STATES PATENTS

| | | |
|---|---|---|
| 260,175 | Durfee | June 27, 1882 |
| 528,012 | McGee et al. | Oct. 23, 1894 |
| 902,545 | Allen | Nov. 3, 1908 |
| 924,306 | Bauroth | June 8, 1909 |
| 2,104,265 | Marsden | Jan. 4, 1938 |
| 2,642,970 | Szekely | June 23, 1953 |

FOREIGN PATENTS

| | | |
|---|---|---|
| 11,106 | Norway | Jan. 16, 1902 |